US012748721B2

(12) United States Patent
Liu et al.

(10) Patent No.: US 12,748,721 B2
(45) Date of Patent: Sep. 29, 2026

(54) DYNAMIC ADDRESSING SYSTEM FOR DATA TRANSMISSION

(71) Applicant: ANPEC ELECTRONICS CORPORATION, Hsinchu (TW)

(72) Inventors: Wei-Chen Liu, Hsinchu City (TW); Che-Chang Chang, Hsinchu County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 33 days.

(21) Appl. No.: 19/093,204

(22) Filed: Mar. 27, 2025

(65) Prior Publication Data

US 2026/0195290 A1 Jul. 9, 2026

(30) Foreign Application Priority Data

Jan. 8, 2025 (TW) ................................ 114100687

(51) Int. Cl.
*G06F 13/42* (2006.01)
*G06F 13/40* (2006.01)

(52) U.S. Cl.
CPC ...... *G06F 13/4291* (2013.01); *G06F 13/4072* (2013.01)

(58) Field of Classification Search
CPC ......................... G06F 13/4291; G06F 13/4672
See application file for complete search history.

(56) References Cited

U.S. PATENT DOCUMENTS 6,975,160 B2 * 12/2005 Garrett, Jr. ........... G11C 7/1051 327/535
6,995,627 B2 * 2/2006 Casper ................ H04L 25/0272 333/28 R
8,775,705 B2 * 7/2014 Horowitz ................. G11C 5/04 710/16
12,056,080 B2 * 8/2024 Oreggia ................ G06F 13/364
12,619,571 B2 * 5/2026 Tal ...................... G06F 13/4282
2014/0140151 A1 * 5/2014 Cha .......................... G11C 7/22 365/194
2018/0181532 A1 * 6/2018 Pitigoi-Aron ....... G06F 13/4291
2018/0181533 A1 * 6/2018 Pitigoi-Aron ....... H04L 12/4013

* cited by examiner

*Primary Examiner* — Henry Tsai
*Assistant Examiner* — Christopher A Daley
(74) *Attorney, Agent, or Firm* — Li & Cai Intellectual Property Office

(57) ABSTRACT

A dynamic addressing system for data transmission includes a plurality of slave devices and a master device. The master device sends a clock signal and a data signal to a first one of the plurality of slave devices. The first one of the slave devices modulates levels of the clock signal, and outputs the modulated clock signal and the data signal to a next one of the slave devices. Each of the plurality of slave devices, except for the first one and a last one of the slave devices, modulates the levels of the clock signal from a previous one of the slave devices, and outputs the modulated clock signal and the data signal to a next one of the slave devices. Each of the plurality of slave devices sets its own individual device address according to the received clock signal and the received data signal.

14 Claims, 5 Drawing Sheets

DYNAMIC ADDRESSING SYSTEM FOR DATA TRANSMISSION

CROSS-REFERENCE TO RELATED PATENT APPLICATION

This application claims the benefit of priority to Taiwan Patent Application No. 114100687, filed on Jan. 8, 2025. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to data transmission, and more particularly to a dynamic addressing system for data transmission.

BACKGROUND OF THE DISCLOSURE

A serial peripheral interface (SPI) is a synchronous serial communication interface having four pins. The serial peripheral interface is able to be applied to high-speed and full-duplex data transmission between a plurality of devices. One of the plurality of devices is used as a master device, and the others of the plurality of devices are used as a plurality of slave devices.

In conventional addressing methods for addressing the plurality of devices through the serial peripheral interface (SPI), the master device sends a command including a plurality of pieces of data sequentially to each of the plurality of slave devices. When each of the plurality of slave devices obtains the command, a counter included in each of the plurality of slave devices starts, and based on an order that the obtained data is arranged among the plurality of pieces of data in the command, a count value is counted in an order that the one of the plurality of slave devices is arranged among the plurality of devices.

In the conventional addressing methods of the plurality of devices, the number of bit values of the command that is sent and transmitted depends on the number of the plurality of devices that are connected with each other in series. Accordingly, time required for transmission of the command is proportional to the number of the plurality of devices. If a large number of devices that are connected with each other in series are addressed by using the conventional addressing methods, a large amount of data needs to be processed and calculated by the master device and the plurality of slave devices. As a result, a long period of time is required for addressing the plurality of slave devices such that an addressing efficiency of the plurality of slave devices is poor. Furthermore, the plurality of devices must have high-performance computing capabilities, resulting in a significant increase in circuit cost.

SUMMARY OF THE DISCLOSURE

In response to the above-referenced technical inadequacies, the present disclosure provides a dynamic addressing system for data transmission. The dynamic addressing system includes a plurality of slave devices and a master device. The plurality of slave devices are sequentially arranged and connected with each other in series. The master device is connected to a first one of the plurality of slave devices. The master device is configured to send a clock signal and a data signal to the first one of the plurality of slave devices. The first one of the plurality of slave devices is configured to modulate a plurality of levels of the clock signal, and output the data signal and the clock signal that is modulated to a next one of the plurality of slave devices. Each of the plurality of slave devices, except for the first one and a last one of the plurality of slave devices, is configured to modulate the plurality of levels of the clock signal from a previous one of the plurality of slave devices, configured to receive the data signal from the previous one of the plurality of slave devices, and configured to output the clock signal that is modulated and the data signal to a next one of the plurality of slave devices. Each of the plurality of slave devices is configured to set an individual device address according to the plurality of levels of the clock signal and a plurality of bit values of the data signal.

As described above, the present disclosure provides the dynamic addressing system for data transmission. In comparison with conventional addressing systems, the amount of data that need to be processed by the plurality of slave devices and the master device of the dynamic addressing system of the present disclosure is effectively reduced. Therefore, even if the master device and the plurality of slave devices of the dynamic addressing system of the present disclosure do not have a high-performance computing capability, the master device and the plurality of slave devices are able to efficiently address the plurality of slave devices.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
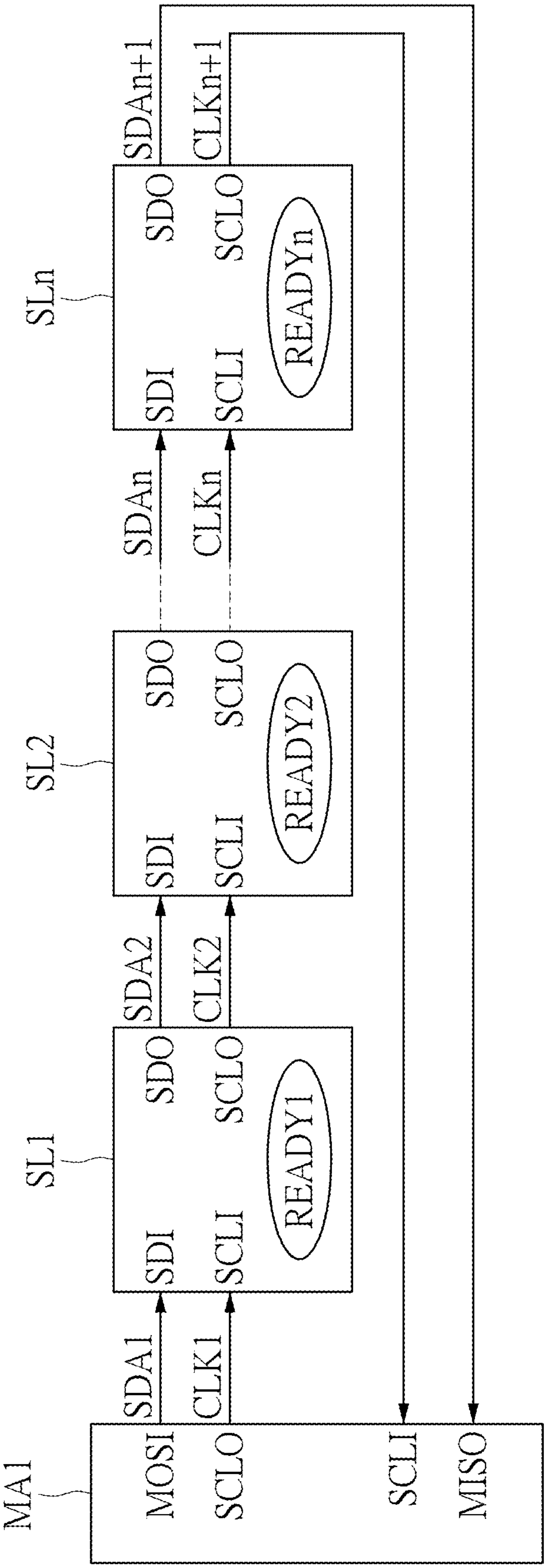
FIG. 1 is a block diagram of a dynamic addressing system for data transmission according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

Reference is made to FIG. 1, which is a block diagram of a dynamic addressing system for data transmission according to a first embodiment of the present disclosure.

The dynamic addressing system of the present disclosure includes a plurality of slave devices SL1 to SLn and a master device MA1 as shown in FIG. 1.

The plurality of slave devices SL1 to SLn are sequentially arranged and connected with each other in series. The master device MA1 is connected to an input terminal of the slave device SL1 that is a first one of the plurality of slave devices SL1 to SLn. The master device MA1 may be further connected to an output terminal of the slave device SLn that is a last one of the plurality of slave devices SL1 to SLn. An input terminal of each of the plurality of slave devices SL1 to SLn, except for the first one of the plurality of slave devices SL1 to SLn, is connected to an output terminal of a previous one of the plurality of slave devices SL1 to SLn.

For example, the master device MA1 has a data output terminal MOSI, a clock output terminal SCLO, a clock input terminal SCLI and a data input terminal MISO. Each of the plurality of slave devices SL1 to SLn has a data input terminal SDI, a clock input terminal SCLI, a data output terminal SDO and a clock output terminal SCLO.

The data output terminal MOSI of the master device MA1 is connected to the data input terminal SDI of the slave device SL1.

The data output terminal SDO of each of the plurality of slave devices SL1 to SLn, except for the slave device SLn, is connected to the data input terminal SDI of a next one of the plurality of slave devices SL1 to SLn. For example, the data output terminal SDO of the slave device SL1 that is the first one of the plurality of slave devices SL1 to SLn is connected to the data input terminal SDI of the slave device SL2 that is the second one of the plurality of slave devices SL1 to SLn. The slave device SL2 is arranged next to the slave device SL1.

The data output terminal SDO of the slave device SLn that is the last one of the plurality of slave devices SL1 to SLn may be connected to the data input terminal MISO of the master device MA1.

The clock output terminal SCLO of the master device MA1 is connected to the clock input terminal SCLI of the slave device SL1 that is the first one of the plurality of slave devices SL1 to SLn.

The clock output terminal SCLO of each of the plurality of slave devices SL1 to SLn, except for the slave device SLn that is the last one of the plurality of slave devices SL1 to SLn, is connected to the clock input terminal SCLI of a next one of the plurality of slave devices SL1 to SLn. For example, the clock output terminal SCLO of the slave device SL1 is connected to the clock input terminal SCLI of the slave device SL2 that is the second one of the plurality of slave devices SL1 to SLn. The slave device SL2 is arranged next to the slave device SL1.

The clock output terminal SCLO of the slave device SLn that is the last one of the plurality of slave devices SL1 to SLn may be connected to the clock input terminal SCLI of the master device MA1.

The master device MA1 generates a data signal SDA1 having a plurality of bit values that include bit values “0” and “1”. The data output terminal MOSI of the master device MA1 sends the data signal SDA1 to the data input terminal SDI of the slave device SL1 that is the first one of the plurality of slave devices SL1 to SLn.

The master device MA1 generates a clock signal CLK1 that includes a plurality of levels such as a plurality of low (logic) levels “0” and a plurality of high (logic) levels “1”. The clock output terminal SCLO of the master device MA1 sends the clock signal CLK1 to the clock input terminal SCLI of the slave device SL1 that is the first one of the plurality of slave devices SL1 to SLn.

It is worth noting that, the slave device SL1 modulates the plurality of levels of the clock signal CLK1 from the master device MA1 to generate a clock signal CLK2, and then the clock output terminal SCLO of the slave device SL1 outputs the clock signal CLK2 to the clock input terminal SCLI of the slave device SL2 that is arranged next to the slave device SL1.

The plurality of slave devices SL1 to SLn, except for the first one and the last one of the plurality of slave devices SL1 to SLn, respectively modulate the plurality of levels of clock signals CLK2 to CLKn−1 from previous ones of the plurality of slave devices SL1 to SLn to output clock signals CLK3 to CLKn to next ones of the plurality of slave devices SL3 to SLn.

The slave device SLn is arranged next to the slave device SLn−1. The slave device SLn may modulate the clock signal CLKn from the slave device SLn−1 to output a clock signal CLKn+1 to the master device MA1, or the slave device SLn may not modulate the clock signal CLKn and may directly output the clock signal CLKn to the master device MA1.

For example, each of the plurality of slave devices SL1 to SLn inverts the plurality of levels of one of the clock signals CLK1 to CLKn that is received by itself for modulating the one of the clock signals CLK1 to CLKn. For example, each of the plurality of slave devices SL1 to SLn inverts each of the plurality of levels of one of the clock signals CLK1 to CLKn from a low level into a high level or from the high level into the low level.

On the other hand, the slave device SL1 that is the first one of the plurality of slave devices SL1 to SLn may output a data signal SDA2 to the slave device SL2 that is arranged next to the slave device SL1 according to the data signal SDA1 from the master device MA1.

The plurality of slave devices SL1 to SLn, except for the first one and the last one of the plurality of slave devices SL1 to SLn, may respectively output a plurality of data signals SDA3 to SDAn to next ones of the plurality of slave devices SL3 to SLn according to a plurality of data signals SDA2 to SDAn−1 from previous ones of the plurality of slave devices SL2 to SLn−1.

The plurality of bit values of the data signal SDA2 may be the same as the plurality of bit values of the data signal SDA1. However, after the plurality of slave devices SL1 to SLn respectively receive the plurality of data signals SDA1 to SDAn and capture the plurality of bit values from the plurality of data signals SDA1 to SDAn for long periods of time, the plurality of slave devices SL2 to SLn+1 respectively delay to output the plurality of data signals SDA2 to SDAn+1. As a result, as shown in FIG. 3, a time difference or a phase difference exists between each one of the plurality of data signals SDA1 to SDAn and a next one of the plurality of data signals SDA1 to SDAn.

Figure 2:
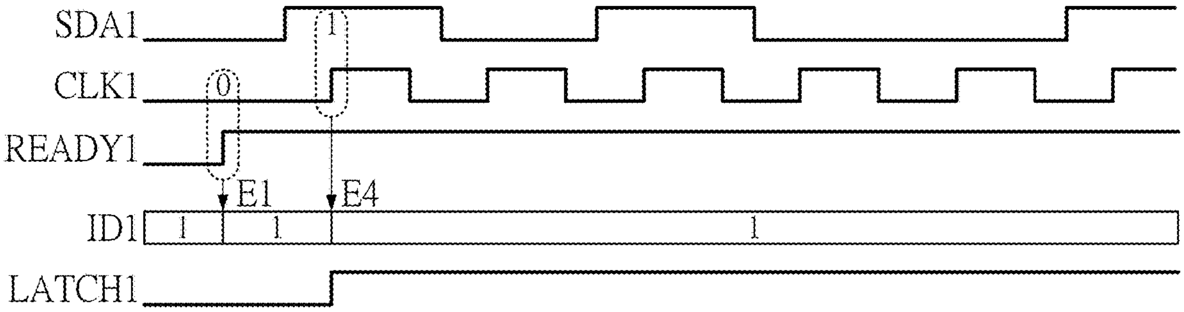
FIG. 2 is a waveform diagram of signals of a first one of a plurality of slave devices of the dynamic addressing system according to the first embodiment of the present disclosure.
Figure 3:
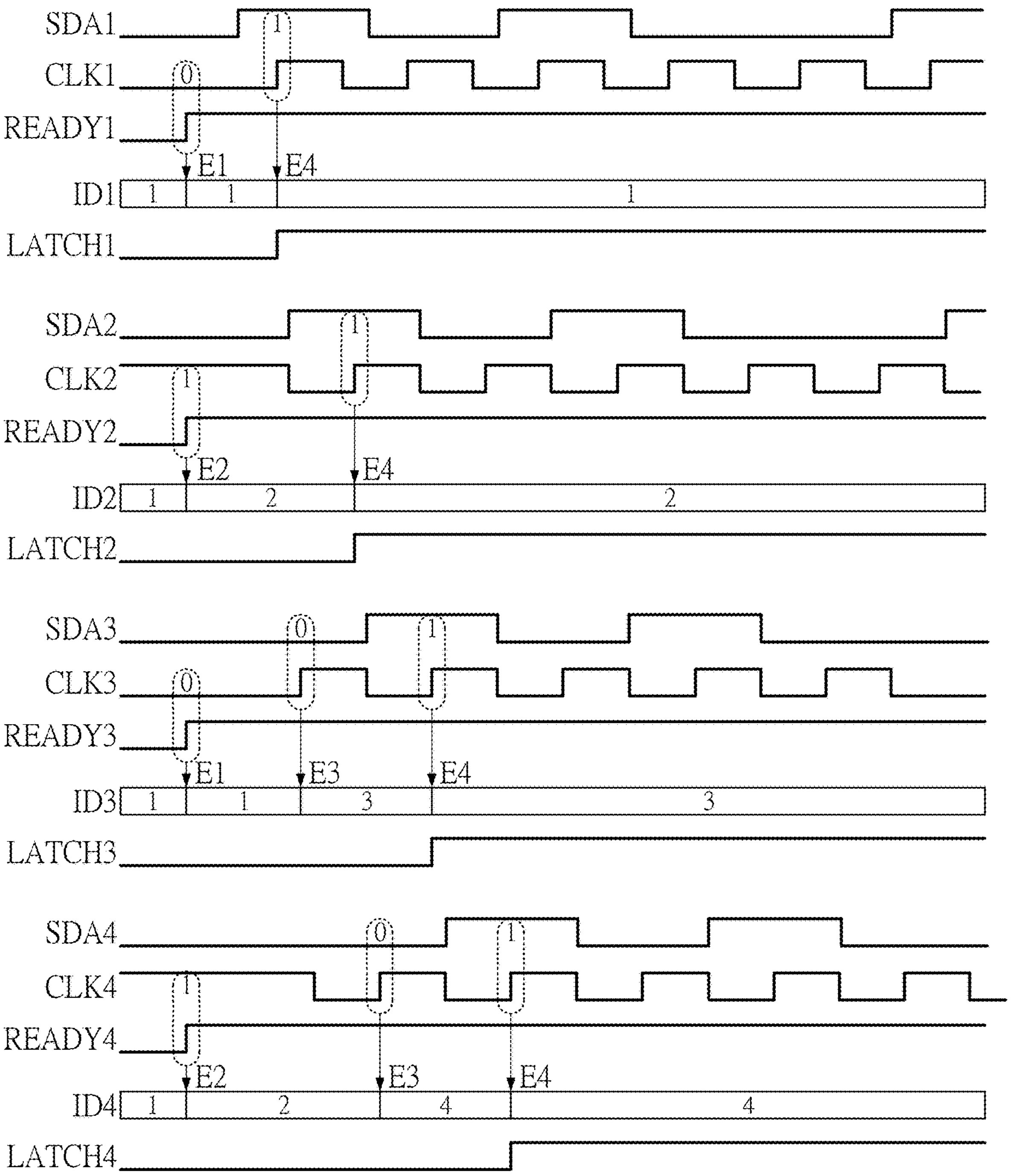
FIG. 3 is a waveform diagram of signals of the plurality of slave devices of the dynamic addressing system according to the first embodiment of the present disclosure.

For example, as shown in FIG. 2 and FIG. 3, each of the plurality of data signals SDA1 to SDAn may include a plurality of waveforms, voltage or logic levels of the plurality of waveforms of the plurality of data signals SDA1 to SDAn at a plurality of time points may respectively represent the plurality of bit values. For example, each of a plurality of high logic levels of the plurality of waveforms may represent the bit value "1", and each of a plurality of low logic levels of the plurality of waveforms may represent the bit value "0".

Each of the plurality of slave devices SL1 to SLn sets an individual device address according to the plurality of levels of one of the plurality of clock signals CLK1 to CLKn that is received by itself and the plurality of bit values of one of the plurality of data signals SDA1 to SDAn that is received by itself. That is, the slave device SL1 sets the individual device address according to the plurality of levels of the clock signal CLK1 and the plurality of bit values of the data signal SDA1. The slave device SL2 sets the individual device address according to the plurality of levels of the clock signal CLK2 and the plurality of bit values of the data signal SDA2.

If necessary, the plurality of slave devices SL1 to SLn may respectively generate or store a plurality of read signals READY1 to READYn.

Each of the plurality of slave devices SL1 to SLn may set the individual device address according to the plurality of levels of one of the plurality of clock signals CLK1 to CLKn that is received by itself, the plurality of bit values of one of the plurality of data signals SDA1 to SDAn that is received by itself and the plurality of levels of one of the plurality of read signals READY1 to READYn that is generated or stored by itself. That is, the slave device SL1 sets the individual device address according to the plurality of levels of the clock signal CLK1, the plurality of bit values of the data signal SDA1 and the plurality of levels of the read signal READY1. The slave device SL2 sets the individual device address according to the plurality of levels of the clock signal CLK2, the plurality of bit values of the data signal SDA2 and the plurality of levels of the read signal READY2.

Reference is made to FIG. 1 to FIG. 3, in which FIG. 1 is a block diagram of a dynamic addressing system for data transmission according to a first embodiment of the present disclosure, FIG. 2 is a waveform diagram of signals of a first one of a plurality of slave devices of the dynamic addressing system according to the first embodiment of the present disclosure, and FIG. 3 is a waveform diagram of signals of the plurality of slave devices of the dynamic addressing system according to the first embodiment of the present disclosure.

The number of the plurality of slave devices SL1 to SLn may be determined according to actual requirements. For convenience of explanation, among the plurality of slave devices SL1 to SLn, only the plurality of slave devices SL1 to SL4 are shown in FIG. 3 and described in detail as follows. The plurality of slave devices SL5 to SLn perform operations corresponding to that performed by the plurality of slave devices SL1 to SL4.

Each of the plurality of slave devices SL1 to SLn aligns the plurality of levels of one of the plurality of read signals READY1 to READYn that is generated or stored by itself respectively with the plurality of levels of one of the plurality of clock signals CLK1 to CLKn that is received by itself. Each of the plurality of slave devices SL1 to SLn aligns the plurality of levels of one of the plurality of clock signals CLK1 to CLKn that is received by itself respectively with the plurality of bit values of one of the plurality of data signals SDA1 to SDAn that is received by itself.

Each of the plurality of data signals SDA1 to SDAn sets the individual device address according to each of a plurality of bit-level groups. The plurality of bit-level groups respectively include the plurality of levels of one of the plurality of read signals READY1 to READYn that is generated or stored by itself, respectively include the plurality of levels of one of the plurality of clock signals CLK1 to CLKn that is received by itself, and respectively include the plurality of bit values of one of the plurality of data signals SDA1 to SDAn that is received by itself. In each of the plurality of bit-level groups, the level of the one of the plurality of read signals READY1 to READYn, the level of the one of the plurality of clock signals CLK1 to CLKn and the bit value of the one of the plurality of data signals SDA1 to SDAn are aligned with each other.

Specifically, as shown in FIG. 2 and FIG. 3, the slave device SL1 aligns the plurality of levels of the read signal READY1 respectively with the plurality of levels of the clock signal CLK1, based on an order that a plurality of waveforms of the clock signal CLK1 are sequentially generated, an order of the plurality of levels of the clock signal CLK1 and an order of the plurality of levels of the read signal READY1.

The slave device SL1 aligns the plurality of levels of the clock signal CLK1 respectively with the plurality of bit values of the data signal SDA1, based on the order that the plurality of waveforms of the clock signal CLK1 are sequentially generated, the order of the plurality of levels of the clock signal CLK1 and an order that the bit values of the data signal SDA1 are sequentially arranged.

As shown in FIG. 2 and FIG. 3, when the slave device SL1 determines that any one of the plurality of levels of the read signal READY1 is equal to a first reference level (such as a high voltage level or a first logic level "1") and the level of the clock signal CLK1 that is aligned with the one of the plurality of levels of the read signal READY1 is equal to an initial reference level (such as a low voltage level or an initial logic level "0"), the slave device SL1 adds an initial preset value such as "0" to an address count value ID1 that is currently equal to an initial count value "1" for counting the address count value ID1. At this time, the address count value ID1 is maintained at the initial count value "1" as marked by an indicator arrow E1 pointing to the address count value ID1 in FIG. 3.

Then, when the slave device SL1 determines that any one of the plurality of levels of the clock signal CLK1 transits from the initial reference level (such as the low voltage level or the first logic level "0") to the first reference level (such as the high voltage level or the first logic level "1") and the level of the data signal SDA1 that is aligned with the one of the plurality of levels of the clock signal CLK1 is equal to the first reference level, the slave device SL1 sets the address count value ID1 that is finally counted to "1" as the individual device address thereof. That is, the slave device SL1 that is the first one of the plurality of slave devices SL1 to SLn sets the individual device address of the slave device SL1 to be equal to "1".

The above description that the clock signal CLK1 transits from the high voltage level or the first logic level "1" may be replaced by a description that the clock signal CLK1 transits from the low voltage level or the second logic level "0". It should be understood that, the clock signal CLK1 transits from the high voltage level or the first logic level "1" at a time point of a rising edge of the clock signal CLK1, and the clock signal CLK1 transits from the low voltage level or the second logic level "0" at a time point of a falling edge of the clock signal CLK1.

After the slave device SL1 sets the individual device address of the slave device SL1 to be equal to "1", the slave device SL1 may modulate a latch signal LATCH1 from an initial latch signal into a preset latch signal. For example, the initial latch signal is at the low voltage level or the initial logic level "0", and the preset latch signal is at the high voltage level or the first logic level "1".

When the latch signal LATCH1 of the slave device SL1 is equal to the initial latch signal, the individual device address of the slave device SL1 is not set yet. Conversely, when the latch signal LATCH1 of the slave device SL1 is equal to the preset latch signal, the individual device address of the slave device SL1 is set. At this time, as marked by an indicator arrow E4 pointing to the address count value ID1 in FIG. 3, the address count value ID1 that is stopped to be counted by the slave device SL1 is aligned with the latch signal LATCH1 that transits to the first logic level "1" from the initial logic level "0".

It is worth noting that, the slave device SL1 inverts the plurality of levels of the clock signal CLK1 to output the clock signal CLK2. As shown in FIG. 3, each one of the plurality of levels of the clock signal CLK2 is opposite to the level of the clock signal CLK1 that is aligned with the one of the plurality of levels of the clock signal CLK2. That is, when any one of the plurality of levels of the clock signal CLK1 is equal to the first logic level "1", the level of the clock signal CLK2 that is aligned with the first logic level "1" of the clock signal CLK1 is equal to the initial logic level "0". Conversely, when any one of the plurality of levels of the clock signal CLK1 is equal to the initial logic level "0", the level of the clock signal CLK2 that is aligned with the initial logic level "0" of the clock signal CLK1 is equal to the first logic level "1".

It should be understood that, as shown in FIG. 3, a time difference or a phase difference between the clock signal CLK1 and the clock signal CLK2 is a delay time within which the slave device SL1 receives the clock signal CLK1, generates the clock signal CLK2, outputs the clock signal CLK2 and performs other operations.

After the slave device SL1 outputs the clock signal CLK2 and the data signal SDA2 to the slave device SL2 that is arranged next to the slave device SL1, the slave device SL2 starts setting the individual device address of the slave device SL2 for addressing of the slave device SL2, which is described specifically as follows.

As shown in FIG. 3, the slave device SL2 aligns the plurality of levels of the read signal READY2 respectively with the plurality of levels of the clock signal CLK2, based on an order that a plurality of waveforms of the clock signal CLK2 are sequentially generated, an order of the plurality of levels of the clock signal CLK2 and an order of the plurality of levels of the read signal READY2.

The slave device SL2 aligns the plurality of levels of the clock signal CLK2 respectively with the plurality of bit values of the data signal SDA2, based on the order that the plurality of waveforms of the clock signal CLK2 are sequentially generated, the order of the plurality of levels of the clock signal CLK2 and an order that the bit values of the data signal SDA2 are sequentially arranged.

When the slave device SL2 determines that any one of the plurality of levels of the read signal READY2 is equal to the first reference level (such as the high voltage level or the first logic level "1") and the level of the clock signal CLK2 that is aligned with the one of the plurality of levels of the read signal READY2 is equal to the first reference level, the slave device SL2 adds a first preset value such as the high voltage level or the first logic level "1" to an address count value ID2 that is currently equal to the initial count value "1" for counting the address count value ID2 to "2" as marked by an indicator arrow E2 pointing to the address count value ID2 in FIG. 3.

Then, when the slave device SL2 determines that any one of the plurality of levels of the clock signal CLK2 transits from the initial reference level (such as the low voltage level or the first logic level "0") to the first reference level (such as the high voltage level or the first logic level "1") and the level of the data signal SDA2 that is aligned with the one of the plurality of levels of the clock signal CLK2 is equal to the first reference level, the slave device SL2 sets the address count value ID2 that is finally counted to "2" as the individual device address thereof. That is, the slave device SL2 that is a second one of the plurality of slave devices SL1 to SLn sets the individual device address of the slave device SL2 to be "2" as marked by the indicator arrow E4 pointing to the address count value ID2 in FIG. 3.

After the slave device SL2 sets the individual device address of the slave device SL2 to be equal to "2", the slave device SL2 may modulate a latch signal LATCH2 from the initial latch signal into the preset latch signal. For example, as marked by the indicator arrow E4 pointing to the address count value ID2 aligned with the latch signal LATCH2 in FIG. 3, the slave device SL2 may modulate the latch signal LATCH2 from the initial latch signal "0" (that is the level of the initial latch signal) into the high voltage level or the first logic level "1" (that is the level of the preset latch signal).

When the latch signal LATCH2 of the slave device SL2 is equal to the initial latch signal, the individual device address of the slave device SL2 is not set yet. Conversely, when the latch signal LATCH2 of the slave device SL2 is equal to the preset latch signal, the individual device address of the slave device SL2 is set. Therefore, the slave device SL2 does not further count up the individual device address of the slave device SL2.

It is worth noting that, the slave device SL2 inverts the plurality of levels of the clock signal CLK2 to output the clock signal CLK3. As shown in FIG. 3, each one of the plurality of levels of the clock signal CLK3 is opposite to the level of the clock signal CLK2 that is aligned to the one of the plurality of levels of the clock signal CLK3. That is, when any one of the plurality of levels of the clock signal CLK2 is equal to the first logic level "1", the level of the clock signal CLK3 that is aligned with the first logic level "1" of the clock signal CLK2 is equal to the initial logic level "0". Conversely, when any one of the plurality of levels of the clock signal CLK2 is equal to the initial logic level "0", the level of the clock signal CLK3 that is aligned with the initial logic level "0" of the clock signal CLK2 is equal to the first logic level "1".

After the slave device SL2 outputs the clock signal CLK3 and the data signal SDA3 to the slave device SL3 that is arranged next to the slave device SL2, the slave device SL3 starts setting the individual device address of the slave device SL3 for addressing of the slave device SL3, which is described in detail as follows.

As shown in FIG. 3, the slave device SL3 aligns the plurality of levels of the read signal READY3 respectively with the plurality of levels of the clock signal CLK3, based on an order that a plurality of waveforms of the clock signal CLK3 are sequentially generated, an order of the plurality of levels of the clock signal CLK3 and an order of the plurality of levels of the read signal READY3.

The slave device SL3 aligns the plurality of levels of the clock signal CLK3 respectively with the plurality of bit values of the data signal SDA3, based on the order that the plurality of waveforms of the clock signal CLK3 are sequentially generated, an order of the plurality of levels of the clock signal CLK3 and an order that the bit values of the data signal SDA3 are sequentially arranged.

When the slave device SL3 determines that any one of the plurality of levels of the read signal READY is equal to the first reference level (such as the high voltage level or the first logic level "1") and the level of the clock signal CLK3 that is aligned with the one of the plurality of levels of the read signal READY is equal to the initial reference level (such as the low voltage level or the initial logic level "0"), the slave device SL3 adds the initial preset value such as "0" to an address count value ID3 that is currently equal to the initial count value "1" for counting the address count value ID3. At this time, the address count value ID3 is maintained at the initial count value "1" as marked by the indicator arrow E1 pointing to the address count value ID3 in FIG. 3.

Then, when the slave device SL3 determines that any one of the plurality of levels of the clock signal CLK3 transits from the initial reference level (such as the low voltage level or the first logic level "0") to the first reference level (such as the high voltage level or the first logic level "1") and the level of the data signal SDA3 that is aligned with the one of the plurality of levels of the clock signal CLK3 is equal to the initial reference level, the slave device SL3 adds a second preset value such as "2" to the address count value ID3 "1" to obtain the address count value ID3 "3" as marked by the indicator arrow E3 pointing to the address count value ID3 in FIG. 3.

Then, when the slave device SL3 determines that any one of the plurality of levels of the clock signal CLK3 transits from the initial reference level (such as the low voltage level or the first logic level "0") to the first reference level (such as the high voltage level or the first logic level "1") and the level of the data signal SDA3 that is aligned with the one of the plurality of levels of the clock signal CLK3 is equal to the first reference level, the slave device SL3 sets the address count value ID3 that is finally counted to "3" as the individual device address thereof. That is, the slave device SL3 that is a third one of the plurality of slave devices SL1 to SLn sets the individual device address of the slave device SL3 to be "3" as marked by the indicator arrow E4 pointing to the address count value ID3 in FIG. 3.

After the slave device SL3 sets the individual device address of the slave device SL3 to be equal to "3", the slave device SL3 may modulate a latch signal LATCH3 from the initial latch signal into the preset latch signal. For example, the initial latch signal is at the low voltage level or the initial logic level "0", and the preset latch signal is at the high voltage level or the first logic level "1".

When the latch signal LATCH3 of the slave device SL3 is equal to the initial latch signal, the individual device address of the slave device SL3 is not set yet. Conversely, when the latch signal LATCH3 of the slave device SL3 is equal to the preset latch signal, the individual device address of the slave device SL3 is set. At this time, the slave device SL3 stops counting the individual device address of the slave device SL3 as marked by an indicator arrow E4 pointing to the address count value ID3 in FIG. 3.

It is worth noting that, the slave device SL3 inverts the plurality of levels of the clock signal CLK3 to output the clock signal CLK4.

After the slave device SL3 outputs the clock signal CLK4 and the data signal SDA4 to the slave device SL4 that is arranged next to the slave device SL3, the slave device SL4 starts setting the individual device address of the slave device SL4 for addressing of the slave device SL4, which is described in detail as follows.

As shown in FIG. 3, the slave device SL4 aligns the plurality of levels of the read signal READY4 respectively with the plurality of levels of the clock signal CLK4, based on an order that a plurality of waveforms of the clock signal CLK4 are sequentially generated, an order of the plurality of levels of the clock signal CLK4 and an order of the plurality of levels of the read signal READY4.

The slave device SL4 aligns the plurality of levels of the clock signal CLK4 respectively with the plurality of bit values of the data signal SDA4, based on the order that the plurality of waveforms of the clock signal CLK4 are sequentially generated, the order of the plurality of levels of the clock signal CLK4 and an order that the bit values of the data signal SDA4 are sequentially arranged.

When the slave device SL4 determines that any one of the plurality of levels of the read signal READY4 is equal to the first reference level (such as the high voltage level or the first logic level "1") and the level of the clock signal CLK4 that is aligned with the one of the plurality of levels of the read signal READY4 is equal to the first reference level, the slave device SL4 adds the first preset value such as the high voltage level or the first logic level "1" to an address count value ID4 that is currently equal to the initial count value "1" for counting the address count value ID4 to "2" as marked by the indicator arrow E2 pointing to the address count value ID4 in FIG. 3.

Then, when the slave device SL4 determines that any one of the plurality of levels of the clock signal CLK4 transits from the initial reference level (such as the low voltage level or the first logic level "0") to the first reference level (such as the high voltage level or the first logic level "1") and the level of the data signal SDA4 that is aligned with the one of the plurality of levels of the clock signal CLK4 is equal to the initial reference level, the slave device SL4 adds the second preset value "2" to the address count value ID4 that is previously counted to "2" to obtain the address count value ID4 being equal to "4" as marked by the indicator arrow E3 pointing to the address count value ID4 in FIG. 3.

Then, when the slave device SL4 determines that any one of the plurality of levels of the clock signal CLK4 transits from the initial reference level (such as the low voltage level or the first logic level "0") to the first reference level (such as the high voltage level or the first logic level "1") and the level of the data signal SDA4 that is aligned with the one of the plurality of levels of the clock signal CLK4 is equal to the first reference level, the slave device SL4 sets the address count value ID4 that is finally counted to "4" as the individual device address thereof. That is, the slave device SL4 that is a fourth one of the plurality of slave devices SL1 to SLn sets the individual device address of the slave device SL4 to be "4" as marked by the indicator arrow E4 pointing to the address count value ID4 in FIG. 3.

Among the plurality of slave devices SL1 to SLn, only the four slave devices SL1 to SL4 are described above, but the plurality of slave devices SL5 to SLn perform the same or corresponding operations as that performed by the four slave devices SL1 to SL4.

It is worth noting that, in a conventional addressing system, in order to address a plurality of devices that are sequentially arranged and connected with each other in series, a master device sends a clock signal having constant levels or constant pulse waves sequentially through the plurality of devices. Each of the plurality of devices operates for a period of time. Therefore, a phase difference or a phase delay is generated between a time point at which the clock signal received by each one of the plurality of devices and a time point at which the clock signal received by a next one of the plurality of devices. If the number of devices that are connected with each other in series and addressed by the conventional addressing system is large, a very large phase difference or phase delay is generated between a time point at which the master device sends the clock signal to a first one of the plurality of devices and a time point at which the master device receives the clock signal from a last one of the plurality of devices. Under this condition, a large number of logic levels "0" and bit values "0" need to add to the clock signal. As a result, when the master device of the conventional addressing system compares the clock signal that is sent by itself and the clock signal from the last one of the plurality of devices for analyzing the number of device, the master device of the conventional addressing system needs to process a large amount of data. Therefore, the conventional addressing system has a poor addressing efficiency.

In contrast, in the dynamic addressing system of the present disclosure, the plurality of slave devices SL1 to SLn respectively receive the plurality of clock signals CLK1 to CLKn, and respectively invert the plurality of clock signals CLK1 to CLKn.

As shown in FIG. 3, the slave device SL1 inverts the plurality of levels of the clock signal CLK1 from the master device MA1 to output the clock signal CLK2 to the slave device SL2. The plurality of levels of the clock signal CLK1 received by the slave device SL1 are respectively opposite to the plurality of levels of the clock signal CLK2 received by the slave device SL2 that is arranged next to the slave device SL1.

Then, the slave device SL2 inverts the plurality of levels of the clock signal CLK2 from the slave device SL1 to output the clock signal CLK3 to the slave device SL3. The plurality of levels of the clock signal CLK2 received by the slave device SL2 are respectively opposite to the plurality of levels of the clock signal CLK3 received by the slave device SL3 that is arranged next to the slave device SL2.

Then, the slave device SL3 inverts the plurality of levels of the clock signal CLK3 to output the clock signal CLK4 to the slave device SL4. The plurality of levels of the clock signal CLK3 received by the slave device SL3 are respectively opposite to the plurality of levels of the clock signal CLK4 received by the slave device SL4 that is arranged next to the slave device SL3.

As a result, in the dynamic addressing system of the present disclosure, only a small phase delay is generated between a time point at which the master device MA1 sends the clock signal CLK1 to the first one of the plurality of slave devices SL1 to SLn and a time point at which the master device MA1 receives the the clock signal CLKn+1 (or, in practice, the clock signal CLKn) from the last one of the plurality of slave devices SL1 to SLn. Therefore, when the master device MA1 of the dynamic addressing system of the present disclosure compares the clock signal CLK1 with the clock signal CLKn+1 (or, in practice, the clock signal CLKn) for analyzing the number of the plurality of slave devices SL1 to SLn, the master device MA1 only needs to process a small amount of data. Therefore, in the dynamic addressing system of the present disclosure, the master device MA1 is able to efficiently address the plurality of slave devices SL1 to SLn based on the data without a high-performance computing capability.

Figure 4:
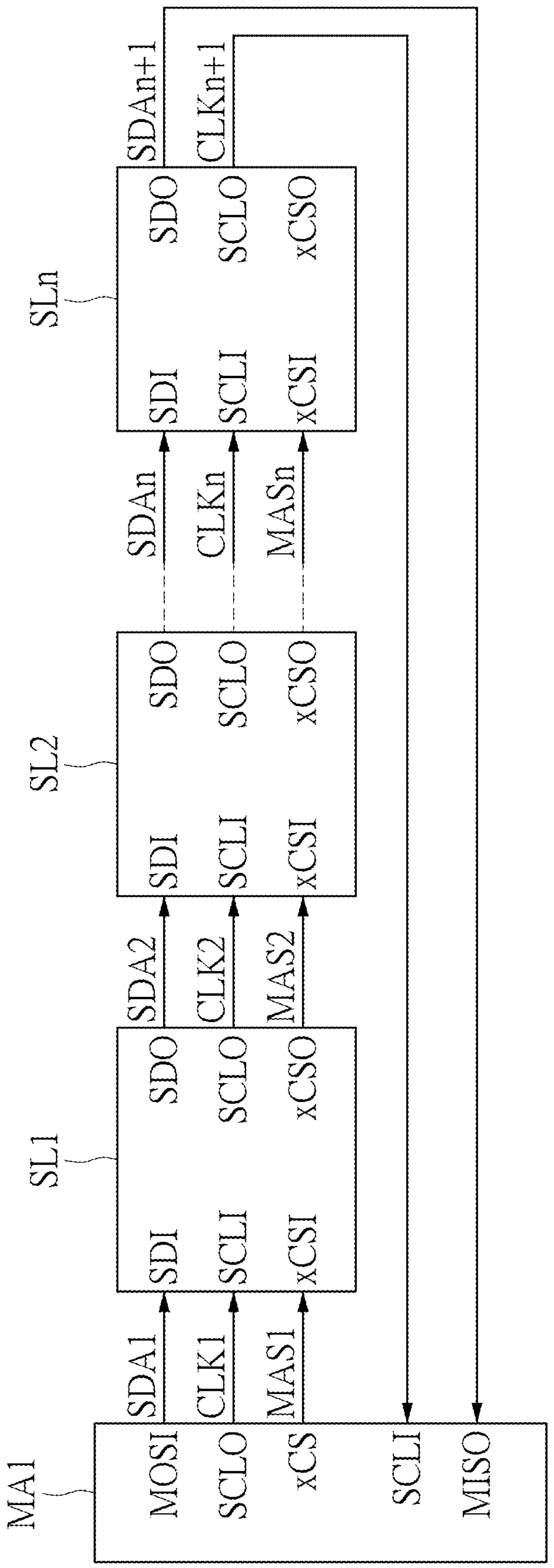
FIG. 4 is a block diagram of a dynamic addressing system for data transmission according to a second embodiment of the present disclosure.
Figure 5:
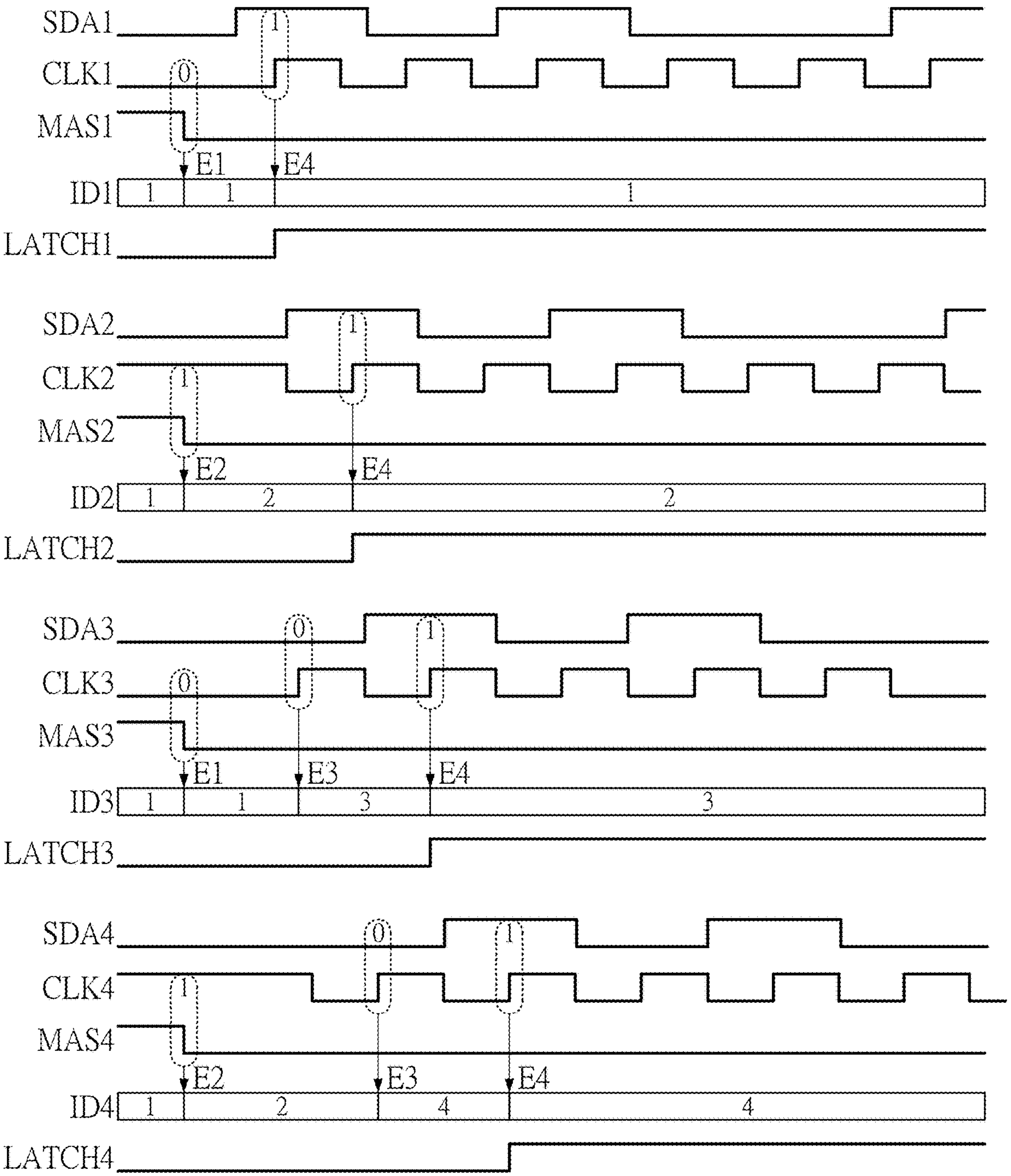
FIG. 5 is a waveform diagram of signals of the plurality of slave devices of the dynamic addressing system according to the second embodiment of the present disclosure.

Reference is made to FIG. 4 and FIG. 5, in which FIG. 4 is a block diagram of a dynamic addressing system for data transmission according to a second embodiment of the present disclosure, and FIG. 5 is a waveform diagram of signals of the plurality of slave devices of the dynamic addressing system according to the second embodiment of the present disclosure.

The descriptions of the second embodiment of the present disclosure that are the same as the descriptions of the first embodiment of the present disclosure are not repeated herein. Differences between the second and first embodiments of the present disclosure are described in detail as follows.

As shown in FIG. 1, in the first embodiment, the plurality of slave devices SL1 to SLn respectively generate or store the plurality of read signals READY1 to READYn. In contrast, as shown in FIG. 4, in the second embodiment, the plurality of slave devices SL1 to SLn do not generate or store the plurality of read signals READY1 to READYn, but the master device MA1 sends a master signal MAS1 and then the master signals MAS1 to MASn are respectively transmitted to the plurality of slave devices SL1 to SLn.

As shown in FIG. 4, in the second embodiment, the master device MA1 not only has the data output terminal MOSI, the clock output terminal SCLO, the clock input terminal SCLI and the data input terminal MISO, but also has a master output terminal xCS.

Each of the plurality of slave devices SL1 to SLn not only has the data input terminal SDI, the clock input terminal SCLI, the data output terminal SDO and the clock output terminal SCLO, but also has a master input terminal xCSI.

The master device MA1 sends the master signal MAS1 to the master input terminal xCSI of the slave device SL1. The slave device SL1, according to the master signal MAS1 from the master device MA1, outputs a master signal MAS2 to the master input terminal xCSI of the slave device SL2 that is arranged next to the slave device SL1. Each of the plurality of slave devices SL3 to SLn performs operations that are the same as that which are performed by the slave device SL1.

As shown in FIG. 5, when each of the plurality of slave devices SL1 to SLn determines a level of one of the plurality of master signals MAS1 to MASn that is received by itself is equal to an the initial reference level (such as the low voltage level or the initial logic level "0") and the level of one of the plurality of clock signals CLK1 to CLKn that is aligned with the level of the one of plurality of master signals MAS1 to MASn is equal to the the initial reference level, each of the plurality of slave devices SL1 to SLn adds the initial preset value such as "0" to the address count value that is currently equal to the initial count value such as "1". As marked by the indicator arrow E1 pointing to the address count values ID1 and ID3 in FIG. 5, the initial preset value such as "0" is added to the address count value that is currently equal to the initial count value such as "1" to obtain the address count value "1".

Then, when each of the plurality of slave devices SL1 to SLn determines the level of one of the plurality of master signals MAS1 to MASn that is received by itself is equal to the the initial reference level and the level of one of the plurality of clock signals CLK1 to CLKn that is aligned with the level of the one of the plurality of master signals MAS1 to MASn is equal to the first reference level, each of the plurality of slave devices SL1 to SLn adds the first preset value such as "1" to the address count value. As marked by the indicator arrow E2 pointing to the address count values ID2 and ID3 in FIG. 5, the initial preset value such as "1" is added to the address count value that is currently equal to the initial count value "1" to obtain the address count value "2".

In conclusion, the present disclosure provides the dynamic addressing system for data transmission. In comparison with the conventional addressing system, the amount of data that is processed by the plurality of slave devices and the master device of the dynamic addressing system of the present disclosure is effectively reduced. Therefore, even if the master device and the plurality of slave devices of the dynamic addressing system of the present disclosure do not have the high-performance computing capability, the master device and the plurality of slave devices are able to efficiently address the plurality of slave devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dynamic addressing system for data transmission, comprising:
- a plurality of slave devices that are sequentially arranged and connected with each other in series; and
- a master device connected to a first one of the plurality of slave devices, and configured to send a clock signal and a data signal to the first one of the plurality of slave devices;
- wherein the first one of the plurality of slave devices is configured to modulate a plurality of levels of the clock signal, and output the data signal and the clock signal that is modulated to a next one of the plurality of slave devices;
- wherein each of the plurality of slave devices, except for the first one and a last one of the plurality of slave devices, is configured to modulate the plurality of levels of the clock signal from a previous one of the plurality of slave devices, configured to receive the data signal from the previous one of the plurality of slave devices, and configured to output the clock signal that is modulated and the data signal to a next one of the plurality of slave devices;
- wherein each of the plurality of slave devices is configured to set an individual device address according to the plurality of levels of the clock signal and a plurality of bit values of the data signal.

2. The dynamic addressing system according to claim 1, wherein each of the plurality of slave devices, except for the last one of the plurality of slave devices, is configured to invert the plurality of levels of the clock signal for modulating the plurality of levels of the clock signal.

3. The dynamic addressing system according to claim 1, wherein the last one of the plurality of slave devices is connected to the master device, and the last one of the plurality of slave devices is configured to directly transit the clock signal from a previous one of the plurality of slave devices to the master device, or configured to invert the plurality of levels of the clock signal and output the clock signal that is inverted to the master device.

4. The dynamic addressing system according to claim 1, wherein each of the plurality of slave devices is configured to generate a read signal, and is configured to align a plurality of levels of the read signal respectively with the plurality of levels of the clock signal and respectively with the plurality of bit values of the data signal;
- wherein each of the plurality of slave devices is configured to set the individual device address according to a plurality of bit-level groups, and each of the plurality of bit-level groups includes one of the plurality of levels of the clock signal and one of the plurality of bit values of the data signal that is assigned with the one of the plurality of levels of the clock signal.

5. The dynamic addressing system according to claim 4, wherein, when any one of the plurality of levels of the read signal is equal to a first reference level and one of the plurality of levels of the clock signal that is assigned with the one of the plurality of levels of the read signal is equal to an initial reference level, each of the plurality of slave devices is configured to add an initial preset value to an address count value.

6. The dynamic addressing system according to claim 5, wherein, when any one of the plurality of levels of the read signal is equal to the first reference level and one of the plurality of levels of the clock signal that is assigned with the one of the plurality of levels of the read signal is equal to the first reference level, each of the plurality of slave devices is configured to add a first preset value to the address count value.

7. The dynamic addressing system according to claim 6, wherein, when any one of the plurality of levels of the clock signal transits from the initial reference level to the first reference level and one of the plurality of levels of the data signal that is assigned with the one of the plurality of levels of the clock signal is equal to the initial reference level, each of the plurality of slave devices is configured to add a second preset value to the address count value.

8. The dynamic addressing system according to claim 7, wherein, when any one of the plurality of levels of the clock signal transits from the initial reference level to the first reference level and one of the plurality of levels of the data signal that is assigned with the one of the plurality of levels of the clock signal is equal to the first reference level, each of the plurality of slave devices is configured to set the address count value as the individual device address.

9. The dynamic addressing system according to claim 8, wherein, after each of the plurality of slave devices sets the individual device address, each of the plurality of slave devices is configured to modulate a latch signal from an initial latch signal into a preset latch signal.

10. The dynamic addressing system according to claim 1, wherein the master device sends a master signal sequentially to the plurality of slave devices;

wherein each of the plurality of slave devices is configured to align a plurality of levels of the master signal respectively with the plurality of levels of the clock signal and respectively with the plurality of bit values of the data signal;

wherein each of the plurality of slave devices is configured to set the individual device address according to the plurality of bit-level groups;

wherein each of the plurality of bit-level groups includes one of the plurality of levels of the master signal, one of the plurality of levels of the clock signal that is assigned with the one of the plurality of levels of the master signal, and one of the plurality of bit values of the data signal that is assigned with the one of the plurality of levels of the master signal.

11. The dynamic addressing system according to claim 10, wherein, when any one of the plurality of levels of the master signal is equal to an initial reference level and one of the plurality of levels of the clock signal that is assigned with the one of the plurality of levels of the master signal is equal to the initial reference level, each of the plurality of slave devices is configured to add an initial preset value to an address count value.

12. The dynamic addressing system according to claim 11, wherein, when any one of the plurality of levels of the master signal is equal to the initial reference level and one of the plurality of levels of the clock signal that is assigned with the one of the plurality of levels of the master signal is equal to a first reference level, each of the plurality of slave devices is configured to add a first preset value to the address count value.

13. The dynamic addressing system according to claim 12, wherein, when any one of the plurality of levels of the clock signal transits from the initial reference level to the first reference level and one of the plurality of levels of the data signal that is assigned with the one of the plurality of levels of the clock signal is equal to the initial reference level, each of the plurality of slave devices is configured to add a second preset value to the address count value.

14. The dynamic addressing system according to claim 13, wherein, when any one of the plurality of levels of the clock signal transits from the initial reference level to the first reference level and one of the plurality of levels of the data signal that is assigned with the one of the plurality of levels of the clock signal is equal to the first reference level, each of the plurality of slave devices is configured to set the address count value as the individual device address.

* * * * *